(12) United States Patent
Hong et al.

(10) Patent No.: US 8,801,342 B2
(45) Date of Patent: Aug. 12, 2014

(54) DRILL BIT

(75) Inventors: Jae-Hyun Hong, Gyunggi-do (KR); Jong-Suk Choi, Seoul (KR); Do-Ui Hong, Gyunggi-do (KR)

(73) Assignee: EHWA Diamond Industrial Co., Ltd., Gyunggi-Do (KR)

( * ) Notice: Subject to any disclaimer, the term of this patent is extended or adjusted under 35 U.S.C. 154(b) by 789 days.

(21) Appl. No.: 12/937,339

(22) PCT Filed: Apr. 10, 2009

(86) PCT No.: PCT/KR2009/001867
§ 371 (c)(1),
(2), (4) Date: Oct. 11, 2010

(87) PCT Pub. No.: WO2009/126004
PCT Pub. Date: Oct. 15, 2009

(65) Prior Publication Data
US 2011/0033253 A1 Feb. 10, 2011

(30) Foreign Application Priority Data
Apr. 11, 2008 (KR) ........................ 10-2008-0033448

(51) Int. Cl.
*B23B 51/06* (2006.01)
*B28D 1/14* (2006.01)
*B28D 1/04* (2006.01)
*B28D 7/02* (2006.01)

(52) U.S. Cl.
CPC ............. *B23B 51/06* (2013.01); *B23B 2226/18* (2013.01); *B23B 2250/12* (2013.01); *B23B 2226/315* (2013.01); *B28D 1/146* (2013.01); *B28D 1/041* (2013.01); *B28D 7/02* (2013.01)
USPC ............ 408/59; 408/204; 408/207; 408/226; 408/145

(58) Field of Classification Search
USPC ............ 408/204, 207, 206, 211, 223, 57, 59, 408/145, 144
See application file for complete search history.

(56) References Cited

U.S. PATENT DOCUMENTS 594,329 A * 11/1897 Cox ................................ 408/59
1,208,164 A * 12/1916 Kelly .............................. 408/59
(Continued)

FOREIGN PATENT DOCUMENTS

DE 19958536 A1 * 6/2001
EP 1495823 1/2005
(Continued)

*Primary Examiner* — Eric A Gates
*Assistant Examiner* — Paul M Janeski
(74) *Attorney, Agent, or Firm* — Dority & Manning, P.A.

(57) ABSTRACT

There is provided a drill bit comprising a bit body having a receptor portion formed therein, the receptor portion being filled with a cutting oil; a drilling portion extended from one end of the bit body, having a channel coupled to the receptor portion formed therein, and having an opening formed in one end thereof and connected to the channel; and a cutting portion provided at a periphery of the opening of the drilling portion for drilling a workpiece, wherein the channel of the drilling portion has a small diameter in order that the cutting oil is not discharged outside of the channel by external pressure or gravitational force, and the channel of the drilling portion has a structure in which capillary action occurs due to cut chips flowing through the channel during drilling of the workpiece so that the cutting oil may be discharged by the capillary action.

6 Claims, 3 Drawing Sheets

(56) References Cited

U.S. PATENT DOCUMENTS

| | | | |
|---|---|---|---|
| 2,427,085 A * | 9/1947 | Allison | 408/145 |
| 2,478,846 A * | 8/1949 | Smith | 408/59 |
| 3,077,802 A | 2/1963 | Philip | |
| 4,664,567 A | 5/1987 | Edwards | |
| 4,854,788 A * | 8/1989 | Okinaga | 408/59 |
| 6,116,825 A | 9/2000 | Kammermeier et al. | |
| 6,792,735 B2 * | 9/2004 | Mohlenhoff | 52/742.16 |
| 7,603,999 B2 * | 10/2009 | Takemura et al. | 125/36 |
| 2005/0155593 A1 * | 7/2005 | Takemura et al. | 125/13.01 |
| 2006/0123801 A1 | 6/2006 | Jackson | |
| 2007/0000700 A1 * | 1/2007 | Switzer | 175/394 |

FOREIGN PATENT DOCUMENTS

| | | |
|---|---|---|
| EP | 1495823 A1 * | 1/2005 |
| GB | 810543 | 3/1959 |
| JP | 03-107114 U | 11/1991 |
| JP | 11-138527 A | 5/1999 |
| JP | 2002-096222 A | 4/2002 |
| JP | 2005-225208 A | 8/2005 |

* cited by examiner

DRILL BIT

FIELD OF THE INVENTION

The present invention relates to a drill bit capable of performing a continuous drilling operation on a high-strength workpiece such as a tempered tile and the like.

DESCRIPTION OF RELATED ART

In general, drill bits are used to form a hole in a workpiece. In particular, the drill bits used in the field of construction are divided into drill bits for forming a hole in a workpiece such as wood or metals; and drill bits for forming a hole in a workpiece such as concrete or stones.

These drill bits have been used to form holes in construction materials such as installed tiles. Recently, tempered tiles made of high-strength materials, which have been used as flooring materials, are installed onto a wall structure of a bathroom, an interior space, or the like in order to offer designs of buildings and the like. Drilling operations should be performed to install necessary facility equipment such as electricity or lightings and a variety of products such as accessories for interior design in construction materials such as high-strength tile installed in these buildings, etc.

However, conventional concrete drill bits do not have as much durability (i.e. strength) as high-strength construction materials to machine the high-strength construction materials. Also, the conventional concrete drill bits generate heat through friction in the drilling of a workpiece. In this case, the drill bits may be thermally deformed by the generated heat of friction prior to drilling the high-strength workpiece. As a result, the drill bits may easily get blunt and finally may not be used any more.

Owing to these above problems, several drill bits should be unavoidably used to drill one workpiece. Also, a continuous drilling operation is impossible to be performed in order to reduce the damage of the drill bits by the generated heat of friction during the drilling operation using each drill bit. That is, the heat of friction generated during the drilling process should be removed in order to drill a workpiece to the maximum extent using the minimum number of drill bits, and, thus, the drilling operations should be intermittently stopped to remove the heat of friction, which leads to the increase in the working time.

BRIEF SUMMARY OF THE INVENTION

Aspects of the present invention are based on the consideration of at least one of the above-mentioned requirements and problems regarding the conventional drill bits.

One aspect of the present invention is to enable a continuous drilling operation on a high-strength workpiece.

Another aspect of the present invention is to suppress the damage of drill bits to the maximum extent, the damage of drill bits being caused by heat of friction generated during the continuous drilling operation on a workpiece.

Still another aspect of the present invention is to enable the refilling of a cutting oil that is used to suppress any increase in temperature through friction.

In order to achieve one of the aspects of the present invention, a drill bit according to one exemplary embodiment of the present invention may have the following characteristics.

The present invention is basically based on the fact that a drill bit is configured so that a cutting oil filled in a receptor portion can be fed to a cutting region by using, as a medium, cut chips flowing through a channel having a capillary structure.

According to an aspect of the present invention, there is provided a drill bit comprising a bit body having a receptor portion formed therein, the receptor portion being filled with a cutting oil; a drilling portion extended from one end of the bit body and coupled to the receptor portion of the bit body to form a channel in which a capillary phenomenon occurs, and having an opening formed in one end thereof; and a cutting portion provided in the opening of the drilling portion to drill a workpiece.

In this case, the bit body may further comprise a coupling portion disposed in a facing inner position of the receptor portion to be attachable and detachable with respect to an electromotive tool, wherein the coupling portion and the receptor portion are configured to form separate spaces divided by a compartment portion.

Here, the compartment portion may be composed of a plug member that is attachably and detachably coupled to seal a space between the coupling portion and the receptor portion. On the other hand, the compartment portion may be integrally formed in the bit body.

Furthermore the cutting portion may be formed of diamond steel. Also, the drilling portion may further comprise a spiral portion in a circumferential surface of the end of the bit body having the opening formed therein.

As described above, the drill bit according to one exemplary embodiment of the present invention may be useful to enable a continuous drilling operation on a high-strength workpiece.

Also, the drill bit according to one exemplary embodiment of the present invention may be useful to enable the refilling of a cutting oil that is used to suppress any increase in temperature through friction, which makes it possible to re-use the drill bit.

In addition, the drill bit according to one exemplary embodiment of the present invention may be useful to suppress the damage of drill bits to the maximum extent, the damage of drill bits being caused by heat of friction generated during the continuous drilling operation on a workpiece.

Additionally, the drill bit according to one exemplary embodiment of the present invention may be useful to shorten a time for the drilling operation on the high-strength workpiece.

Furthermore, the drill bit according to one exemplary embodiment of the present invention may be useful to drill the high-strength workpiece to the maximum extent using the minimum number of drill bits.

DETAILED DESCRIPTION OF THE INVENTION

Figure 1:
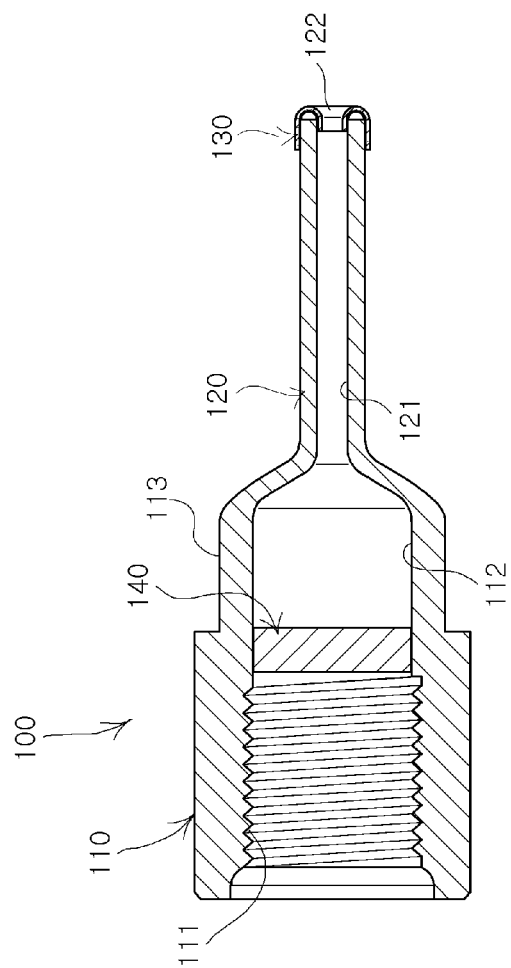
FIG. 1 is a schematic cross-sectional view illustrating an inner configuration of a drill bit according to one exemplary embodiment of the present invention.

Hereinafter, a drill bit according to one exemplary embodiment of the present invention will be described in detail for better understandings of the above-mentioned characteristics of the present invention.

Hereinafter, the best exemplary embodiments of the present invention will be described in detail for the better understandings of the technical characteristics of the present invention, but the technical characteristics of the present invention are not particularly limited to the best exemplary embodiment, so it is considered that the present invention can be realized as the best exemplary embodiments.

Therefore, it should be understood that other equivalents and modifications could be made thereto without departing from the scope of the invention.

Furthermore, for reference numerals that are marked hereinafter in the accompanying drawings for better understanding of the exemplary embodiments of the present invention, parts and their related counterparts that have the same functions in these exemplary embodiments of the present invention are represented by the same numbers or their serial numbers.

Related exemplary embodiments of the present invention are basically based on the fact that a drill bit is configured so that a cutting oil filled in a receptor portion can be fed to a cutting region by using, as a medium, cut chips flowing through a channel having a capillary structure.

Figure 2:
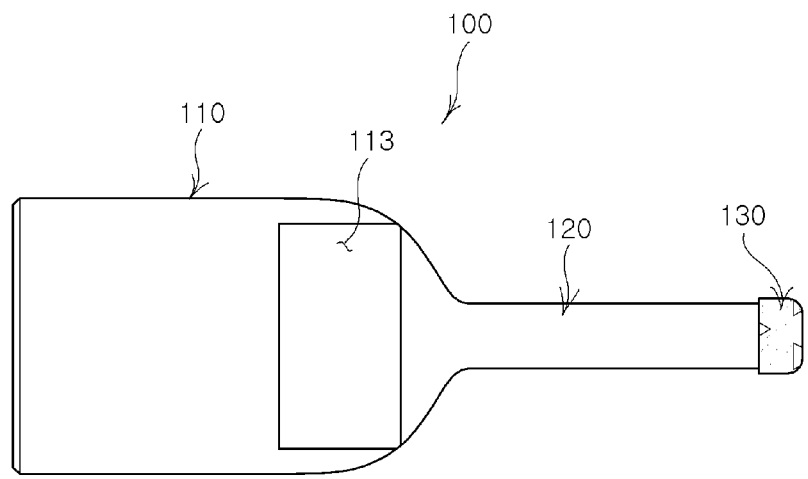
FIG. 2 is a front view illustrating the drill bit as shown in FIG. 1.

FIGS. 1 and 2 show a drill bit 100 according to one exemplary embodiment of the present invention. The drill bit 100 may be configured to form a drilling portion 120 extended from one end of the bit body 100 mounted on an electromotive tool 10. A receptor portion 112 that will be filed with a cutting oil may be formed inside the bit body 110, and a channel coupled to the receptor portion 112 may be formed inside the drilling portion 120.

The drilling portion 120 may have an external diameter corresponding to a diameter of a hole that will be formed through a workpiece 1, and may be formed in the form of a pipe having a certain length. In this case, the channel 121 formed inside the drilling portion 120 may be configured so that a cutting oil 150 filled in the receptor portion 112 can be maintained intact without being affected by external pressures (for example, an atmospheric pressure). Also, the channel 121 may have a structure where a capillary action may also be produced so that the cutting oil 150 filled in the receptor portion 112 cannot be discharged from the receptor portion 112 by the gravity.

An opening 122 is formed in one end of the drilling portion 120. Here, the cutting oil 150 may move from the receptor portion 112 along the channel 121, and be discharged to a drilling region of the workpiece 1 through the opening 122.

Meanwhile, a cutting portion 130 may be formed around the opening 122. In this case, the cutting portion 130 may be configured by coupling a member, which is made of separate materials, with an end (the circumference of the opening) of the drilling portion 120, as shown in FIGS. 1 and 2. In this case, the cutting portion 130 may be formed of a generally known material such as diamond steel. Meanwhile, the cutting portion 130 may be formed as the drilling portion 120 in itself. For example, the cutting portion 130 may be configured by subjecting the entire drilling portion 120 or some region of the opening 122 to widely known processes such as heat treatment so that they can have a high rigidity.

Also, the bit body 110 may be further provided with a coupling portion 111 disposed in a facing inner position of the receptor portion 112 so that the bit body 110 can be attachably and detachably coupled with an electromotive tool 10. For example, the coupling portion 111 may be configured by forming a hole through the bit body 110, forming a screw thread in an inner surface of the hole to screw the bit body 110 to the electromotive tool 10. In this case, a tool-applying portion 113 may also be further formed in any one position of the bit body 110 to couple the bit body 110 to an electromotive tool 10 using a tool such as a spanner.

On the other hand, the bit body 110 may be simply configured so that a circumferential surface of the bit body 110 can be engagedly mounted on the electromotive tool 10. In this case, the bit body 110 may be configured so that it can have a spherical or polygonal appearance.

Meanwhile, a compartment portion 140 may be provided so that a compartment of the coupling portion 111 can be formed as a space that is independent of the receptor portion 112 formed inside the bit body 110. The compartment portion 140 may be formed integrally with the bit body 110 by forming the compartment portion 140 as some part of the bit body 110. Unlike this configuration, the compartment portion 140 may also be a member such as stopper that may be attachably and detachably coupled to the bit body 110 so that it can seal a compartment of the coupling portion 111 as a space that is independent of the receptor portion 112.

When the compartment portion 140 is a member such as a stopper, the compartment portion 140 may be configured so that it can be coupled to the bit body 110 by means of the coupling portion 111. For example, when the coupling portion 111 is formed in a screw structure, the coupling portion 111 may be configured so that a screw thread can be formed around the compartment portion 140 to screw the compartment portion 140 to the coupling portion 111. Meanwhile, when the compartment portion 140 has an attachable and detachable structure, a widely known sealing structure may apply to the compartment portion 140 in order to enhance a sealing force between compartments of the receptor portion 112 and the coupling portion 111. For example, the leakage of a cutting oil filled in the receptor portion 112 may be prevented by applying a sealing O-ring to a space between the compartment portion 140 and an inner side wall of the receptor portion 112 or an inner side wall of the coupling portion 111.

Figure 3:
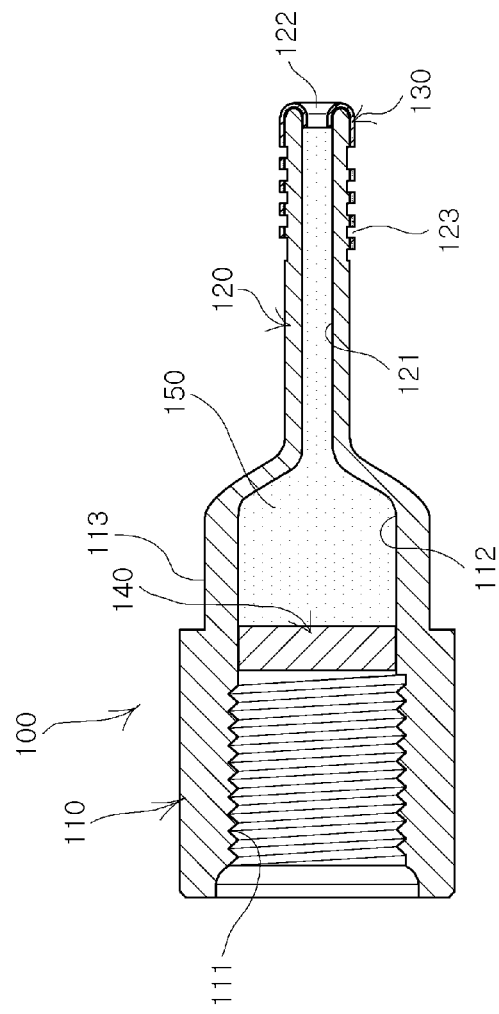
FIG. 3 is a schematic cross-sectional view illustrating an inner configuration of a drill bit according to another exemplary embodiment of the present invention.

As shown in FIG. 3, in accordance with another exemplary embodiment of the drill bit 100, a spiral portion 123 may be further provided in an end region of the drilling portion 120, for example, in a region that is adjacent to the cutting portion 130 or is extended from the cutting portion 130. The spiral portion 123 may be configured to facilitate the discharge of the cut chips of the workpiece 1 cut by the cutting portion 130. The spiral portion 123 may be formed by spirally machining the drilling portion 120 by itself, or by coupling a separate member to the drilling portion 120.

Other configurations except for the configuration of the spiral portion 123 may be realized in the same manner as in the above-mentioned exemplary embodiment, and therefore their detailed descriptions are omitted for clarity.

Figure 4:
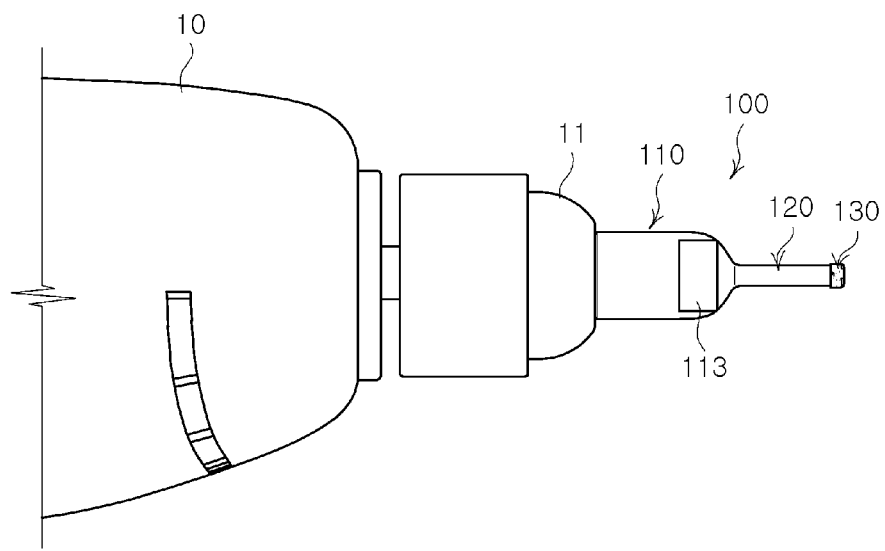
FIG. 4 is a diagram illustrating an installation of the drill bit according to one exemplary embodiment of the present invention in an electromotive tool.
Figure 5:
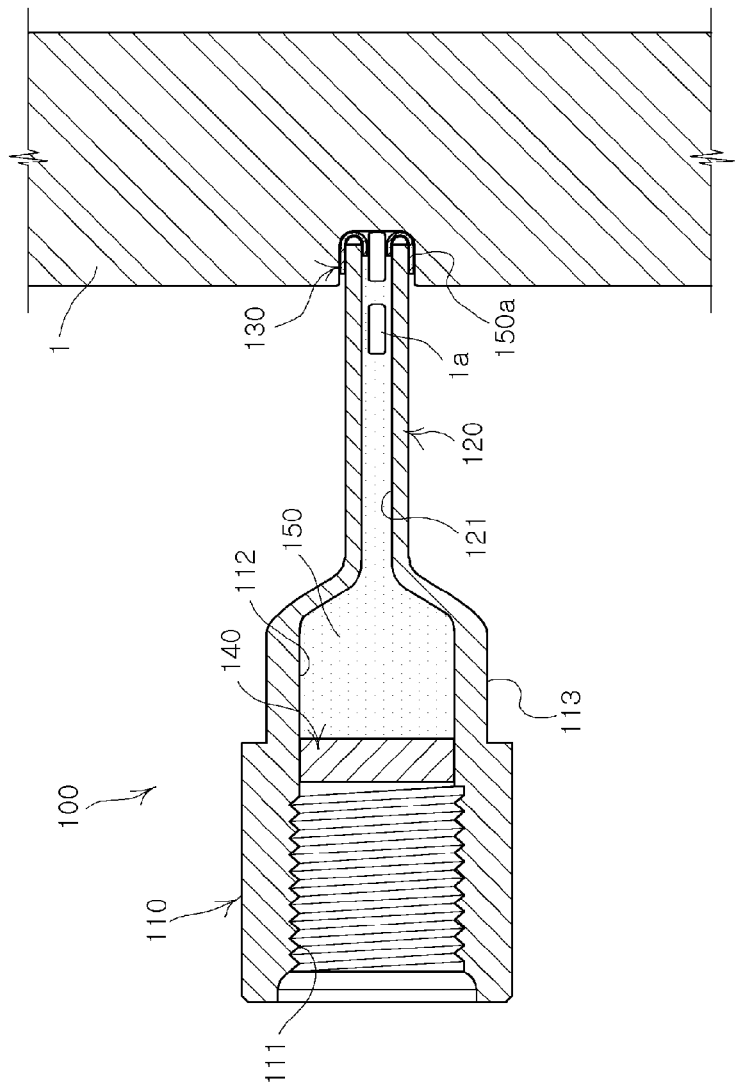
FIGS. 5 and 6 are diagrams illustrating a drilling operation on a workpiece using the drill bit according to one exemplary embodiment of the present invention in an electromotive tool.

As shown in FIG. 4, the drill bit 100 may be coupled to a mounting portion 11 of the electromotive tool 10 to form a hole in the workpiece 1. The workpiece 1 thus mounted on the electromotive tool 10 is rotated by the electromotive tool 10, thereby drilling the workpiece 1 using the cutting portion 130 provided in the drilling portion 120, as shown in FIG. 5. In this case, some chips 1a out of the chips cut from the workpiece 1 flow into the channel 121 of the drilling portion 120. The chips 1a flowing into the channel 121 assimilate into the cutting oil 150 disposed in the channel 121. As a result, the cutting oil 150 disposed inside the receptor portion 112 is discharged to a cutting region (drilling region) of the workpiece 1 via the opening 122 by using, as a medium, the chips 1a flowing into the channel 121.

In this case, the cutting oil 150a discharged to the cutting region functions to cool the cutting portion 130 whose temperature is increased by the heat of friction generated in the workpiece 1. Also, the cutting oil 150 filled in the receptor portion 112 functions to intercept the heat from the cutting portion 130 as the cutting oil 150 discharged through the channel 121.

Figure 6:
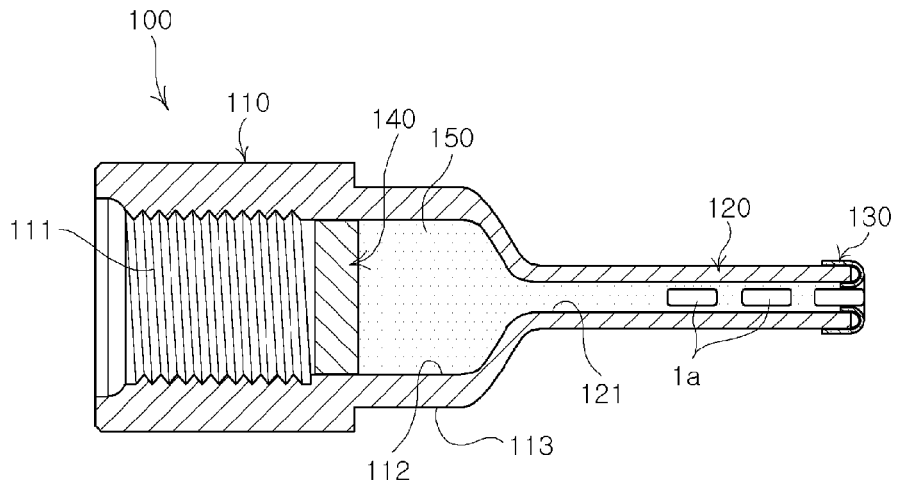

FIG. 6 shows that cut chips 1a flow into a channel 121 after drilling the workpiece 1. As described above, some chips 1a out of the cut chips formed in the drilling of the workpiece 1 push the cutting oil 150 in the receptor portion 112 while flowing along the channel 121. Then, when cut chips formed in drilling another workpiece continue to flow into the receptor portion 112, the cut chips that previously flow into the receptor portion 112 are pushed by newly cut chips, and flow into an inner part of the receptor portion 112. Then, these processes may be repeated to feed the cutting oil 150.

Meanwhile, when the compartment portion 140 has an attachable and detachable structure, the compartment portion 140 may be detached after the complete consumption of the cutting oil 150 filled in the receptor portion 112. After the cut chips 1a are removed from the receptor portion 112, the receptor portion 112 may be re-filled with a fresh cutting oil 150 for the purpose of the reuse of the drill bit 100.

The drill bit as described above is not limited to the exemplary embodiments disclosed, but all or some of the exemplary embodiments can be selectively combined to form modifications and variations.

The invention claimed is:

1. A drill bit, comprising:
a bit body having a receptor portion formed therein, the receptor portion being filled with a cutting oil;
a drilling portion extended from one end of the bit body, having a channel coupled to the receptor portion formed therein and having an opening formed in one end thereof and connected to the channel; and
a cutting portion provided at a periphery of the opening of the drilling portion for drilling a workpiece,
wherein the channel of the drilling portion has a small diameter in order that the cutting oil filled in the receptor portion is not discharged outside of the channel by external pressure or gravitational force, and
the channel of the drilling portion has a structure in which capillary action occurs due to cut chips flowing through the channel during drilling of the workpiece so that the cutting oil is discharged by the capillary action.

2. The drill bit of claim 1, wherein the bit body further comprises a coupling portion disposed in an inner position of the bit body and facing the receptor portion to be attachable and detachable with respect to an electromotive tool, wherein the coupling portion and the receptor portion are configured to form separate spaces divided by a compartment portion.

3. The drill bit of claim 2., wherein the compartment portion is composed of a plug member that is attachably and detachably coupled to seal a space between the coupling portion and the receptor portion.

4. The drill bit of claim 2, wherein the compartment portion is integrally formed in the bit body.

5. The drill bit of claim 1, wherein the cutting portion is formed of diamond steel.

6. The drill bit of claim 1, wherein the drilling portion further comprises a spiral portion in a circumferential surface of the drilling portion having the opening formed therein.

* * * * *